(12) United States Patent
Walker

(10) Patent No.: US 6,650,771 B1
(45) Date of Patent: Nov. 18, 2003

(54) COLOR MANAGEMENT SYSTEM INCORPORATING PARAMETER CONTROL CHANNELS

(75) Inventor: Douglas G. Walker, Boston, MA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/447,118

(22) Filed: Nov. 22, 1999

(51) Int. Cl.[7] .............................. G06K 9/00; G06K 9/54
(52) U.S. Cl. ........................................ 382/162; 382/302
(58) Field of Search ................................ 382/162, 167, 382/172, 260, 263, 264, 274, 300, 302; 345/501, 600, 601–604; 358/500, 515, 518, 527, 1.1, 1.9, 506, 520, 521, 525, 530

(56) References Cited

U.S. PATENT DOCUMENTS

| | | | | |
|---|---|---|---|---|
| 5,091,972 A | * | 2/1992 | Kwon et al. | 382/263 |
| 5,208,911 A | | 5/1993 | Newman et al. | 395/162 |
| 5,420,979 A | * | 5/1995 | Madden et al. | 395/162 |
| 5,432,906 A | * | 7/1995 | Newman et al. | 395/162 |
| 6,351,558 B1 | * | 2/2002 | Kuwata | 382/168 |
| 6,408,103 B1 | * | 6/2002 | Gallagher et al. | 382/260 |

OTHER PUBLICATIONS

U.S. patent application Ser. No. 09/103,466, Walker, filed Jun. 23, 1999.

* cited by examiner

*Primary Examiner*—Andrew W. Johns
*Assistant Examiner*—Amir Alavi
(74) *Attorney, Agent, or Firm*—David M. Woods

(57) ABSTRACT

A system that stores a color management transform, typically using a grid table, where one or more of the input channels represents parameters used to control the reproduction of the conventional color image channels. The invention augments the existing grid-table based transform structure with additional channels to control the operation of the color models involved. These additional channels are not the conventional calorimetric or colorant image channels such as red, green, and blue, but are to control other aspects of the color transformation, such as exposure level or saturation. The augmentation also includes identification information that identifies the type of control (exposure, grey component replacement, etc.) the extra channels provide.

42 Claims, 4 Drawing Sheets

COLOR MANAGEMENT SYSTEM INCORPORATING PARAMETER CONTROL CHANNELS

FIELD OF THE INVENTION

The present invention is directed to providing existing color management systems with additional control information and, more particularly, to augmenting existing color transformation tables with additional channels to allow for control of other aspects of the transformation process, such as, exposure level or saturation.

BACKGROUND OF THE INVENTION

Multi-dimensional interpolation tables are a very useful means of representing color transforms as described in U.S. Pat. No. 5,208,911 incorporated by reference herein. These transform structures map colors in an input color space to an output color space. The color spaces involved may be device-dependent color spaces, such as RGB, CMY, CMYK, Hi-Fi spaces (involving CMYK plus additional colorant channels such as orange and green ink), or device-independent color spaces based on colorimetry, such as CIE XYZ, CIE uvL, and CIE L*a*b*. These tables (grid tables) are often generated by evaluating a sophisticated computer model or function on a uniform multi-dimensional lattice (or grid) over the input color space. The output colors produced by the function are stored in the table. One dimensional look-up tables (LUTs) are used to condition the input to and output from the grid table to allow the values stored in the grid to be more linear (and hence amenable to representation in this tabular form).

The success of using grid tables to represent color transforms is due largely to two factors. First, it is often faster to evaluate the multi-dimensional look-up table than it is to evaluate the original computer model representation of the transform. This can be very important when one needs to process millions of image pixels. Second, a single grid table structure implies a relatively small amount of software must be written to evaluate any transform represented in this format. This is very important in areas such as color management where it is beneficial to have all imaging software applications and operating systems be able to apply these color transformations. The number and variety of the computer models used to model imaging devices, color appearance transforms, and aesthetic enhancement effects are such that it would be impossible for the developers of software applications to implement support for all of them. The current grid table based approaches are a compromise in that the developers of software applications only need to implement support for a single transform format and the developers of color management software need only produce profiles in this single format even though a variety of mathematical models may be used to compute the contents of the profile.

One of the drawbacks of the existing systems that use a grid table based transform structure is the large number of profiles (a computer file having one or more transforms for a specific device) sometimes required for a single imaging device. For example, in CMYK printing it is conventionally necessary to provide separate profiles for different utilization of the black ink and limits on total ink (known in the printing trade as gray component replacement (GCR) and total area coverage (TAC)). It is common to provide fifteen profiles for a single printing process so that the user may choose the black usage that they desire. Another example relates to input profiles for film scanners. Separate profiles for a given type of film and scanner may be provided that account for different exposure levels of the film. Perhaps three to five profiles would be provided for a range from under-exposed to over-exposed film originals.

Having to provide multiple profiles for a single device is not only cumbersome but it is also only an approximate solution. For example, a user may have a film original whose exposure was somewhere in between the different levels provided by the profile vendor. Or, a printer may want to use a GCR/TAC combination that is intermediate to the levels supplied. This situation has prevented many manufacturers from using a profile-based approach or to only do part of the processing using profiles. For example, a film scanner manufacturer may do some initial image processing in the scanner or software driver that uses a non-profile based type of computer model to account for exposure variation on the film. Also, makers of printing devices may do some custom computer modeling in the printer or its software driver to allow for different usage of black or different paper types. Generally, it is still necessary to generate profiles for these devices in addition to whatever custom processing they do. However, a given profile will only be valid for a fixed setting of the parameters for these additional processing routines. This makes the color management of the system less robust and more confusing to the end-user—the peripheral driver must often be adjusted separately from the color management system settings.

Also, these custom modeling stages, separate from the color management system, limit the choices available to the end-user. If the transformation structure used in a color management system is published, as in the case of the International Color Consortium Profile Format, it is possible for a number of vendors to make transformations available. Therefore, if all color processing is under control of the color management system, users have more flexibility. For example, a user may want to get exposure compensation software from a different vendor than the scanner manufacturer.

SUMMARY OF THE INVENTION

It is an object of the present invention to provide a system that not only allows color transforms but one that allows transformation based on other information.

It is another object of the present invention to provide a system that augments a grid table with additional channels to control aspects of color models in addition to color.

It is also an object of the present invention to add dimensions to a grid table that represent control information other than color.

It is a further object of the present invention to provide a system that allows the result of color processing using a grid table to be varied in a continuous manner based on information other than pixel color.

It is an additional object of the present invention to provide a unified transform structure that may be used to represent arbitrary processing algorithms involving parameters in addition to color.

It is an object of the present invention to provide a means of representing such transforms for convenient use by a color management system.

It is another object of the present invention to provide a means for a user to modify the result of such a transformation via a graphical user interface.

The above objects can be attained by a system that stores a color management transform, typically using a grid table where one or more of the input channels (and, if necessary, output channels) represent parameters used to control the reproduction of the conventional color image channels. The transform also includes identification information that identifies the type of control (exposure, black ink type, etc.) the extra channels provide. During a transformation the system can evaluate the color image channels at fixed values of the control channels. In doing this, the system creates subgrids at the fixed values of the control channel parameters, thereby reducing the number of dimensions involved in the production transformation process.

These together with other objects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE INVENTION

The invention augments the existing grid-table based transform structure with additional channels to control the operation of the color models involved. These additional channels are not the conventional image channels, such as, red, green, and blue (that is, neither colorant nor colorimetric values), but are used to control other aspects of the color transformation. Each control channel can include discrete values within a range or vary continuously over the desired range. In a conventional situation, a computer model that converts film scanner device values in RGB space to CIELAB values may also have a parameter that corresponds to the exposure level on the film. With current profile formats, one could choose a few values of this parameter, say five values ranging from under-exposure to over-exposure, and evaluate the computer model on a lattice of points in RGB space to generate five profiles. The present invention takes an alternative approach, and adds a fourth input dimension to the profile structure to represent exposure level. Thus, instead of a profile that transforms R, G, B values to a*, b*, L* values, one would have a profile that takes R, G, B and exposure values and generates a*, b*, L* values. This allows the custom computer model (the model including control values as well as calorimetric values) to be represented in a unified profile structure. Another advantage is that it allows for an unlimited number of exposure settings rather than just a few values. Also, the exposure could be varied on a pixel by pixel basis (for example if part of the scene were in direct sun and part in shade). This allows one to provide a single transform instead of a set of transforms. A further advantage is that systems can be built that do not need to rely on any custom image processing steps outside of the control of the color management system. This unified profile structure could feasibly have 10 or more input dimensions. However, with transforms having a large number of dimensions, it may be appropriate to split the transform into several parts, as discussed later herein.

Figure 1:
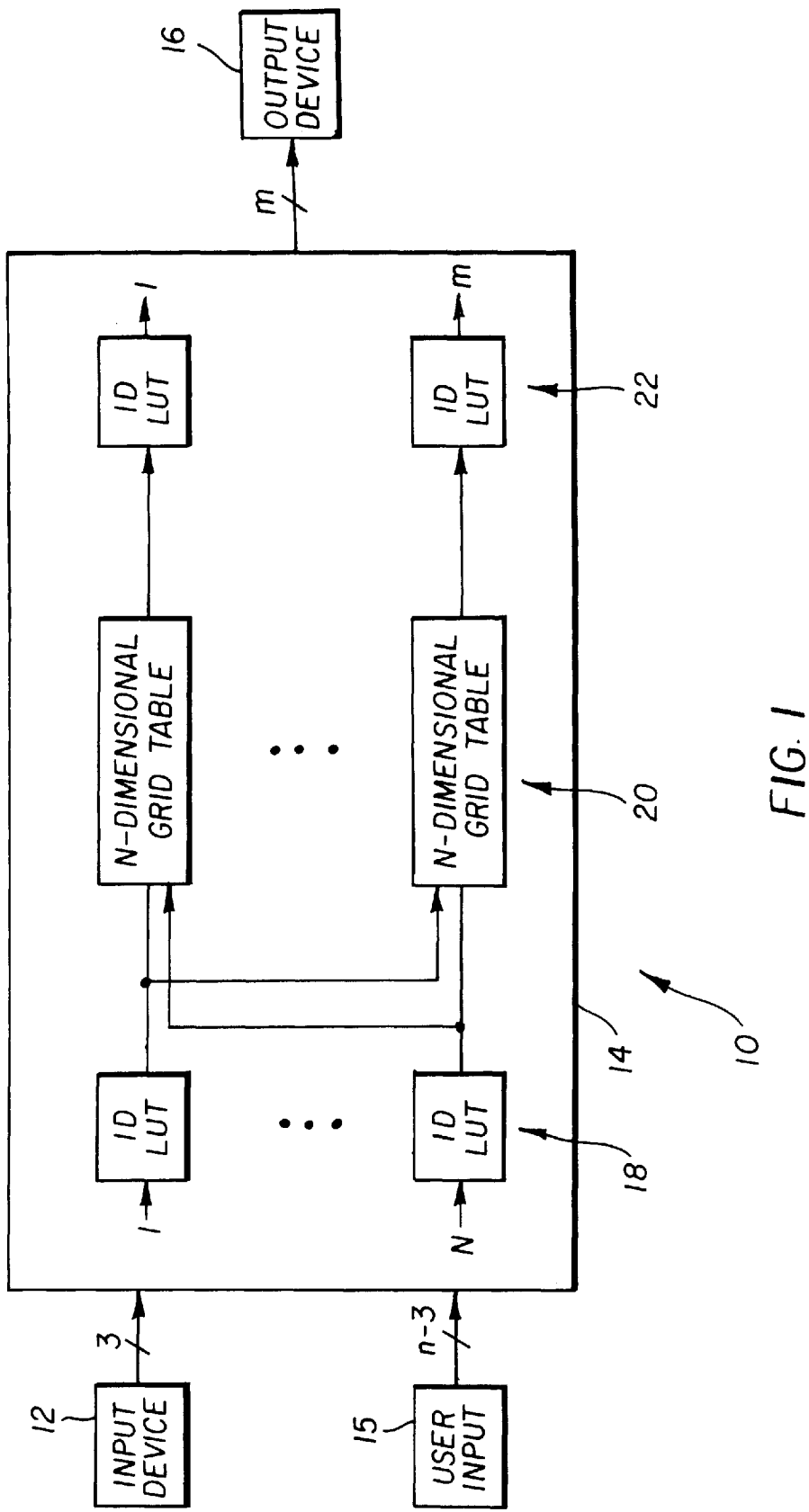
FIG. 1 depicts a system of the present invention.

The present invention is typically implemented in a system 10, such as depicted in FIG. 1. An input device 12, such as a color scanner (CD ROM, network, etc.) provides color values such as red, green and blue. These input values are supplied to a computer 14, such as a conventional desk-top personal computer. A user interface 15 is used to collect values for the control parameters such as exposure level and contrast level (such as high-key, normal, low-key) for the image. Alternatively, the control values could be estimated from the image by image analysis software or could simply be default values. The total number of image channels and control channels is n. As mentioned earlier, while the image channels vary from pixel to pixel, the control channels may be constant for an entire image (although they are not so restricted). The computer 14 converts or transforms the n input values into m output values such as RGB, CMYK, or CIELAB supplied to an output device 16, such as a printer (display, storage device, network, etc.). In the computer 14, the input values are provided to n one dimensional look-up tables 18 which perform operations such as input value conditioning (for example, scaling). The outputs of the tables 18 are provided to m grid tables 20 each having n input dimensions. The grid tables 20 perform the conversion or transform from one color space to another based on the color information as well as the control channel information. The outputs of the grid tables 20 are provided to m one dimensional look-up tables 22 which perform output signal conditioning. The signal conditioning done by the input 18 and output 22 one-dimensional tables serves to make the function computed in the grid tables more nearly linear and hence amenable to tabular representation and a linear interpolation method. Interpolation in the grid tables may be done using a method such as that described in U.S. patent application Ser. No. 09/103,466, entitled, "Method and Apparatus For Multi-dimensional Interpolation", filed Jun. 23, 1998, and incorporated by reference herein.

The computer 14 also includes storage, such as floppy disks, hard disks, etc. (not shown), such that the processes and the transforms (augmented grid tables) of the present invention can be provided on a computer readable medium. The processes of the invention can also be transferred over another medium, such as a packet-switched network like the Internet, that the computer 14 can read using conventional network interfaces.

Figure 2:
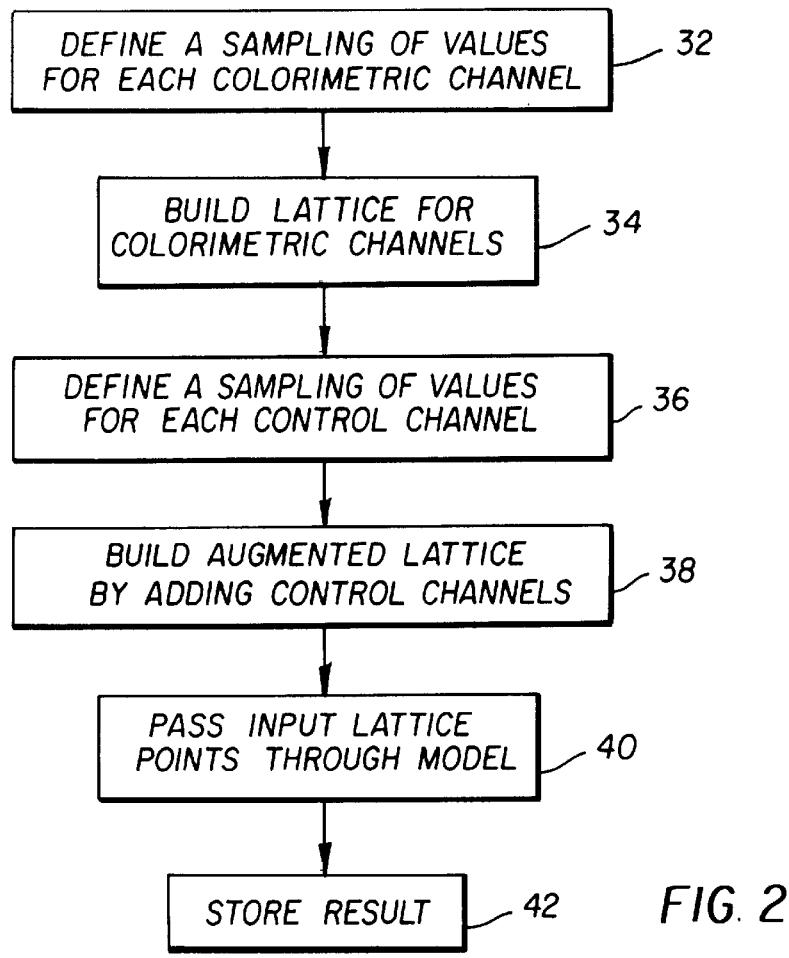
FIG. 2 illustrates creating an enhanced grid table according to the present invention.

In a first approach to creating the augmented grid table, additional channels can be added to a color transform or grid table in the same manner as the current "conventional" image channels are built up. As with current techniques, the process begins by defining 32 (see FIG. 2) a sampling of values along each of the image dimensions. For example, 10 equally spaced values that cover the domain of the red channel, 10 for green, and 10 for blue. This sampling essentially defines a regular rectangular lattice of points in RGB space. Each point in the three-dimensional lattice is one of the possible combinations of the red, green, and blue sample points. Proceeding through the lattice in a predetermined order generates 34 a list of the RGB coordinates of each point in the lattice. In this example, there are 10*10*10=1000 points. (The pre-determined order is an aspect of the format used to store the grid tables ultimately produced, see for example, U.S. Pat. No. 5,208,911.) In the present invention, new operations 36 and 38 are added. Operation 36 defines a sampling of values that cover the domain of any desired control parameters. For example, five values of a parameter that controls the amount of color saturation in the image such as [0, 0.25, 0.5, 0.75, 1.0] where 0 corresponds to reduced color saturation, 0.5 corresponds to unchanged saturation and 1.0 corresponds to increased saturation. The combination of image dimensions and control dimensions now defines a four-dimensional lattice. In operation 38, proceeding through this augmented lattice in a pre-determined order produces a list of all combinations of red, green, blue, and saturation level. In this example, there are 10*10*10*5=5000 points in the augmented set. A transform from input to output may be generated by storing, in the specified order, the results of evaluating 40 this augmented lattice of points through the computer model the transform is to represent and storing 42 the results as the transform grid table. In this operation, each of the input values is supplied to the model (equation) and the output (result) is recorded creating a transform pair. These points can then be used to create the transform or grid table. Note that the number and spacing of points chosen to represent each dimension is different and may vary depending on the amount of curvature in the function to be represented. As with conventional grid-based transforms, one-dimensional LUTs may be used to condition the input to and output from the grid table to make the values stored in the grid more linear. In particular, non-linear input tables may be used to achieve non-linear spacing of the lattice points.

During use of the generated grid table, in a situation where the control channel values are varying for each pixel of the input image over the range of interest, the control channel values, along with the calorimetric values, are supplied as inputs for interpolation in the multidimensional control channel image transform grid tables and the interpolated values are output. This results in a pixel by pixel transform that takes into account pixel by pixel changes in the control channel information. However, because processing speed is inversely proportional to the number of dimensions of the table, transform of an image with many control channels can be somewhat time consuming. In situations where the control channel value is constant, such as when a constant saturation change is desired for all pixels, a different technique can be used. To speed processing, the constant control channels are processed out of the transform. If all control channels are constant, a transform similar to those used in current color management systems is produced.

Figure 3:
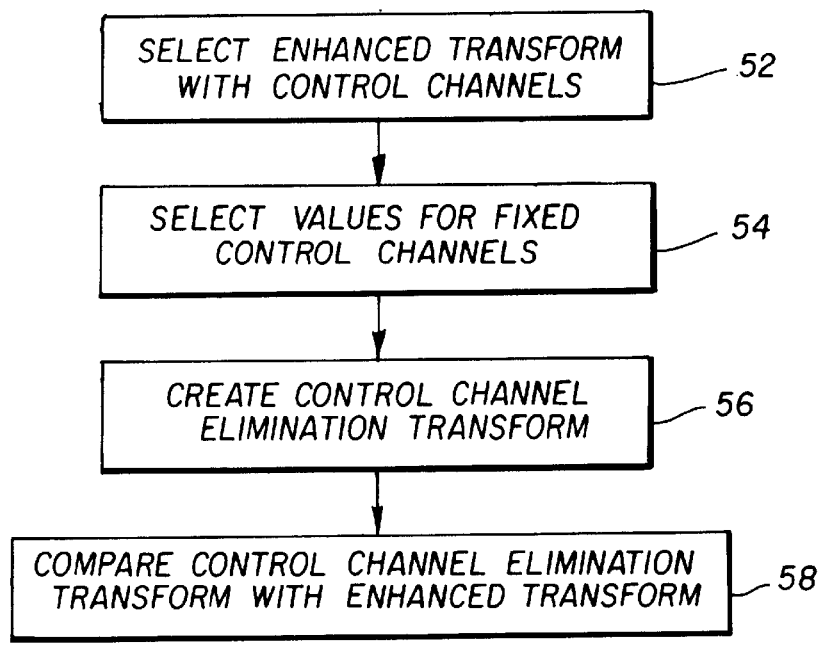
FIG. 3 illustrates how to remove control channels from an enhanced transform to create a production transform.

As illustrated in FIG. 3, the creation of a production grid table when some control channel values are constant starts with selecting 52 a first (or control channel image) transform with n input dimensions, created as described above. Next, the user or system determines 54 which of k control channels are fixed and what value they have. For example, desired saturation is fixed at a value of 0.65 exposure for a particular image. Then, a second transform is formed or created 56 with n-k input dimensions and n output dimensions. This transform is created using the process shown in FIG. 2, except in operation 36 the k fixed control channels will have only a single sample point and operation 38 is not performed (or else the function is simply an identity). This transform is an identity in the dimensions to be preserved and constant in the dimensions to be processed out of the transform. It should be noted, however, that the efficiency gains come from the reduction in the number of input dimensions from n to n-k and not the constancy of the control parameters. In fact, the values of the k channels being eliminated may be allowed to vary throughout the lattice of points produced in operation 56 without affecting the utility of this procedure (and this can produce some interesting transforms). Finally, the second or constant control channel elimination transform is combined or composed 58 with the first or control channel image transform using functional composition to produce the more efficient transform with a reduced number of control channels. U.S. Pat. No. 5,432,906, incorporated by reference herein, describes how to compose transforms.

Figure 4:
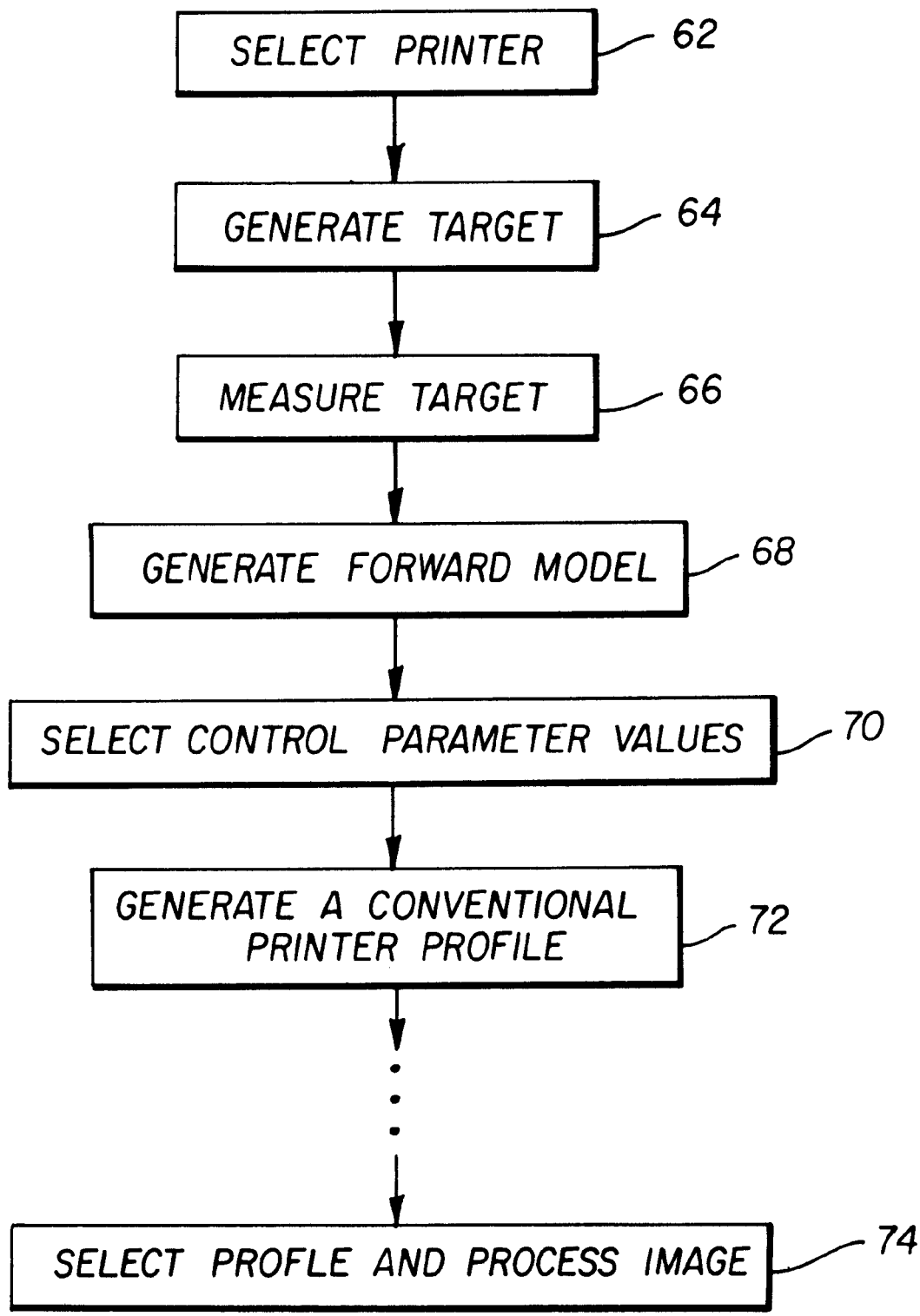
FIG. 4 shows operations in building a conventional profile and applying it to an image.

Before describing how the present invention is used to process images, it is important to understand how control information is typically used to build CMYK printer profiles and process images using a product, such as, the Kodak Colorflow ProfileEditor (CPE) version 2.1 software application and the associated color management system software. As depicted in FIG. 4, the user builds a conventional printer profile using CPE by first selecting 62 a particular printer. A color target generation process generates 64 a color target which is printed on the selected printer. Next, the user performs a measurement 66 of the CIE colorimetric values of the printed target using an automated device, such as a calorimeter, and a mathematical model of the transformation from the device color space of the printer to CIE colorimetry is fit 68. The user then selects 70 a fixed value for each desired of the desired parameters, such as GCR, black start, and TAC that are used to control the printing of images using cyan, magenta, yellow, and black colorants. Techniques such as gamut compression and model inversion are then used along with the selected values of the control parameters to produce 72 a profile (in the International Color Consortium or ICC format) containing a transform from CIELAB to CMYK values for the printer. At some later time, when an image that needs to be converted and printed by the selected printer is available, the user selects the profile for the fixed value of desired parameters (GCR, black start, TAC) and the system processes 74 the image. If the user wants to change any of control parameters, CPE must be invoked again to build a separate ICC profile for the new settings repeating operations 70 through 74. The effort of invoking CPE multiple times and the inconvenience of keeping track of multiple profiles for a single printer (one for each set of parameter settings) are limitations of this current method.

Figure 5:
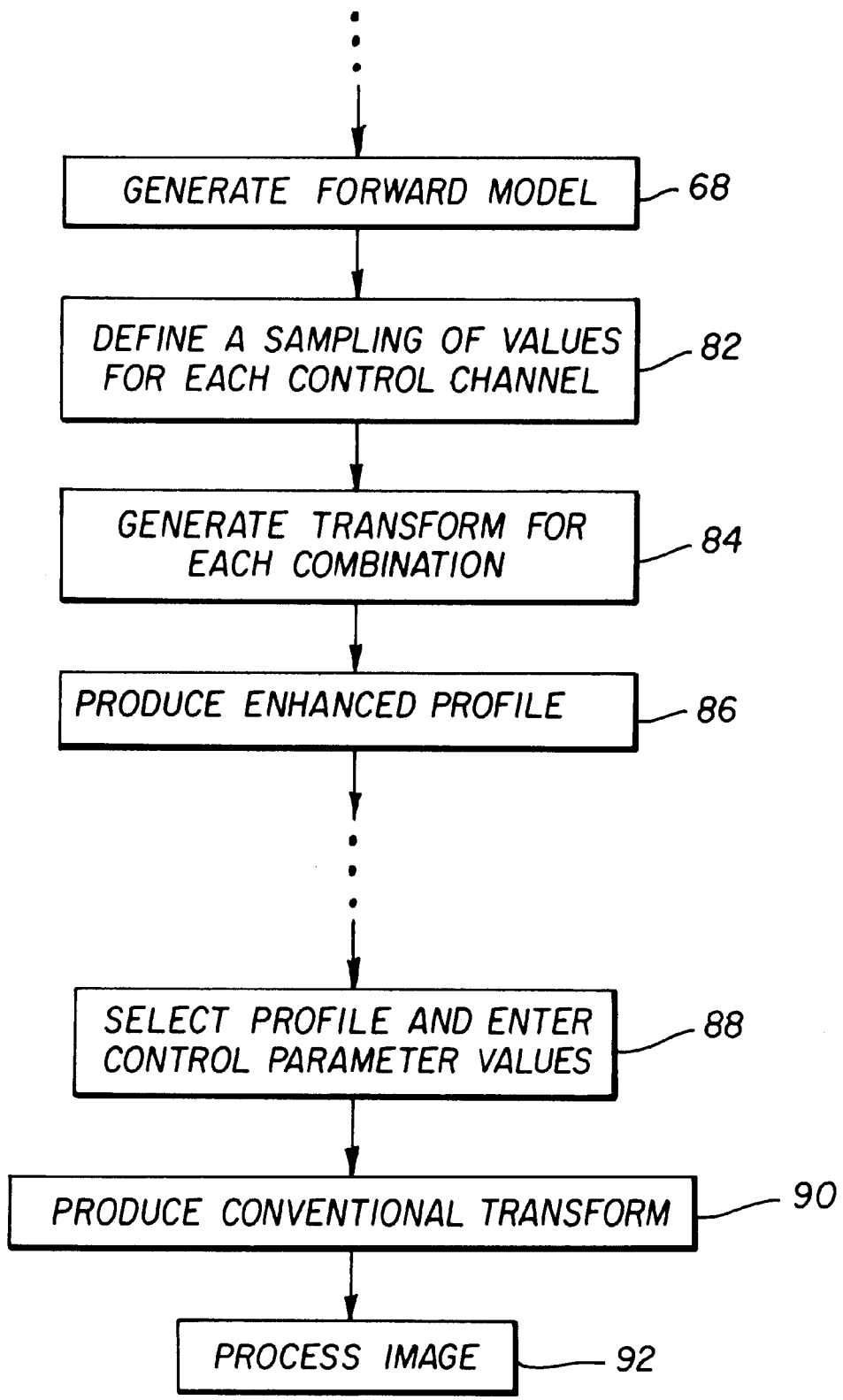
FIG. 5 depicts the operations in building an enhanced profile and in processing an image when the present invention is used.

In contrast, the process is very different when the present invention is used as depicted in FIG. 5. The steps 62–68 are the same. Instead of selecting a single fixed value (or set of fixed values) for the control parameters, the system selects 82 a discrete set of values for each desired control channel parameter covering a desired domain. At this point, a lattice of points including all dimensions can be created, as discussed with respect to FIG. 2. For example, if the control channels are to be GCR (gray component replacement), black start (the gray level at which black ink starts being used), and TAC (total area coverage or maximum allowed inking), the sampling of operation 36 might contain GCR settings of {light, medium, heavy}, black start values of {early, late} and TAC values of {280%, 320%, 360%, 400%}. For the purposes of computer representation, the named values would be translated into numeric descriptions that can be supplied to the software routines that calculate 84 the table values. If the operation 32 sampling for CIELAB image channels has 10 values for a*, 10 for b*, and 10 for L*, then there will be 10*10*10*3*2*4=24,000 combinations in the lattice of points to be processed by the software (via gamut compression, model inversion, etc.) into CMYK values. A single enhanced profile is then created 86 that embodies information about a complete range of control parameter settings. At some later time, when an image that needs to be converted and printed by a desired printer is available, the user or system selects 88 the single profile and the user enters the desired parameter values (for example, GCR, black start, TAC). The input operation involves the system recognizing that an enhanced profile is being used by examining the profile data structure for a control parameter dimension entry and prompting for the desired control parameter values. The system then generates 90 a conventional (un-enhanced) profile by eliminating the control channels at the input parameter values as shown in FIG. 3. Each time new/different input parameter values are encountered, the enhanced profile is used to generate an appropriate conventional profile (which may be temporary). The image is then processed 92 through the conventional profile and output, in this example, for printing.

The enhanced profiles may be stored using a format similar to that of a conventional profile. The one-dimensional look-up tables (LUTs) and multi-dimensional grid tables may be stored using the same structures as are used in conventional profiles. However, the enhanced profile needs to contain information that distinguishes the control channels from the image channels, such as a field within the profile that identifies the number of control channels included. This information should also be sufficient to generate a graphical user interface suitable for obtaining user input for the parameter values. It is desirable that such a user interface contain both a "slide bar" that can be controlled with a mouse as well as a box for accepting numeric input from the keypad. This means that the profile should contain character strings that label the control, such as, "Saturation Level" and that label the both ends of the slide bar, such as, "Low" and "High". To enable numeric input there should be included a corresponding number for both ends of the slide bar, such as, 0.0 and 1.0 as well as the numeric value to be used as a default value such as 0.5. The default is used as the initial value of the interface elements and can be used to eliminate the control channels when no information about user preference is available. Effective means for encoding such numeric data and character strings are well known in the art and may easily be included in a device color profile.

The apparent drawbacks of the invention are that by increasing the number of input dimensions, one increases the size of the resulting transform and the amount of time necessary to evaluate pixels through the transform. The size problem could be addressed through various compression techniques. However, the problem is not as bad as it seems, since a single enhanced transform may replace a whole set of conventional transforms. The processing time problem may be addressed as well, as shown in FIG. 3.

There are many situations in which this invention may be used. One example is the previously mentioned need to have CIELAB to CMYK transforms for a variety of types of usage of black ink. The black ink used may be parameterized via two or three variables, such as, the amount of GCR and TAC. Then two new input channels may be constructed for the transform. In other words, the grid table will be generated by evaluating the computer model on a five dimensional lattice of points corresponding to the five input dimensions of a*, b*, L*, GCR, and TAC. From this one transform, CMYK values may be generated for any desired levels of GCR and TAC. These parameters could even vary on a pixel by pixel basis if desired.

Also mentioned above, was the use of the invention in film scanning. In this scenario, a control channel transform could correct for exposure errors when the scene was exposed. Since exposure errors affect not only level but color balance, separate red, green, and blue controls adjustments could be provided. Rather than provide RGB controls, a more useful approach is to provide a first control channel that corrects for over or under exposure but would not affect neutrality. Second and third control channels would provide correction along blue-yellow and red-green color difference axes and control the color balance but not affect the lightness-darkness. In the latter scenario, the enhanced transform may have input channels of red, green, blue scanner values, lightness control, blue-yellow balance control, and red-green balance control or six total input dimensions. Output would typically be three calorimetric dimensions, such as, CIELAB a*, b*, L*.

Another way of using the invention to correct scanner signals can be based on stringing together a sequence of conventional and enhanced transforms. In this scenario, a first conventional transform is used to convert scanner RGB into some image correction color space, such as printing density. Since the image values at this point in the chain have not yet been corrected, it is crucial that this standard space have a large enough range of values to encode substantial exposure errors. (For example, CIELAB is insufficient since an upper L* limit of 100 would not accommodate over-exposed images.) Next, several enhanced transforms are used to correct the image. These transforms would have the image correction color space (such as RGB printing density) as both input and output. In addition, they would have control channels that allow for the color modification. The number of enhanced transforms depends on the number of problems which need to be addressed. For example, if only exposure errors are expected, then a single enhanced transform is sufficient (the control channels would be lightness, blue-yellow balance, and red-green balance as described above). However, it may also be desirable to include an enhanced transform to correct for contrast deficiencies due to development chemistry that was not properly controlled. In this case, an additional enhanced transform with control channels of red contrast adjustment, green contrast adjustment, and blue contrast adjustment may be useful. Finally, a conventional transform is used to convert the corrected image in the image correction color space to a standard color space, such as, CIELAB.

In most situations it is desirable to allow a user to adjust the values of the control parameters while viewing the effect of the changes on a calibrated color monitor. Current color management systems can process millions of pixels per second through conventional transforms based on multi-dimensional grid tables. Since the enhanced transforms leverage the same type of data structure, the invention can be implemented in such a way as to easily provide interactive user feedback on current personal computers. In a typical application, there will be a sequence of enhanced and conventional transforms (with the last transform in the chain typically converting from a standard space, such as, CIELAB to monitor RGB for the preview image). These transforms may be applied sequentially to the image or, for faster processing speed, they may be composed together (as described above) into a single transform. As the user adjusts a control parameter via the graphical user interface, a conventional transform may be computed from the enhanced transform being adjusted at the selected parameter levels as shown in FIG. 3. This conversion process, the composition of the chain into a single transform, and the processing of a small preview image takes only a fraction of a second in a typical system.

Another use of the invention is to allow color appearance models to be represented in a standard format. For example, a model of the human visual response to color, such as, that of Hunt (described in "Reproduction of Colour", $5^{th}$ ed. R.

W. G. Hunt, Foundation Press, England, 1995) predicts how the appearance of colors change as a function of various parameters that control visual adaptation. Using the invention, one could generate a transform that takes CIELAB and values of several adaptation parameters as input and produces CIELAB values for the adapted colors as output.

Another application of the invention is as a standard method of representing color editing transformations. There are many software packages that are available that allow a user to adjust aspects of the color reproduction in an image such as brightness, contrast, color balance, and color saturation (for example, Adobe Photoshop™). However, there are no standards for these types of transformations and it may be difficult for a user to achieve the same type of results with two different software applications. One can currently provide ICC profiles (or some other profile format) containing CIELAB to CIELAB effects such as a change in contrast or saturation. This allows a user to obtain exactly the same correction in any software package that supports ICC profiles. Unfortunately, this is not a practical approach since one would have to provide a very large number of profiles to cover the desired range of adjustment in sufficiently fine levels to be useful.

Alternatively, a package such as Kodak Colorflow™ can be used to generate a profile for a given level of the effect. However, this is also cumbersome, for example, if one is already editing the image in Photoshop one must take the image into CPE to generated a conventional transform that has a specific amount of the effect transform and then go back to Photoshop and continue editing. The invention provides a solution to the problem. A single enhanced transform can be generated that will provide a specific type of effect, such as a continuously variable color saturation adjustment. The input values could be CIELAB and one or more parameters that control the effect such as gain (amount of boost or reduction) and threshold (to prevent boosting saturation of neutrals). This allows for great flexibility for the user since the effect could be both controlled and applied in any application that supports a color management system using the new enhanced transform structure.

Additionally, the invention opens up new creative possibilities since the effect can now be applied easily on a pixel by pixel basis. For example, a user could add a fourth channel to the image to correspond to a control channel in the enhanced transform structure and then use paint tools to paint into this channel and thereby control some aspect of a color transformation effect. If the channel controlled the saturation boost, the user could paint in areas that they wanted to receive the most of this effect. If the channel controlled the exposure level, painting into the control channel would be similar to conventional darkroom techniques (such as dodge and burn) for controlling printing from a negative.

In addition to allowing the user to interactively paint into a control channel, the signal driving the control channel could be generated by other means. For example, the control channel could be used to minimize noise/graininess in an image. Color transforms amplify the noise in parts of color space if the gain in that region is greater than one. This cannot be avoided if one wants to map the input colors to the correct output colors. However, one may want to tradeoff color accuracy for reduced noise amplification. This tradeoff could be made once for the image as a whole. However, the invention allows the tradeoff to be incorporated parametrically into the transform structure. A high-pass filter could be used in this case to generate the inputs to a control channel on a pixel by pixel basis. Thus, the tradeoff between color accuracy and noise amplification could be made a function of scene content for superior results.

There are other examples of tradeoffs that could be allowed to vary across the image. For example, one may want to map colors differently on faces than on similar colors in the rest of the image. Simply knowing the CIELAB coordinates of a pixel is insufficient to determine whether it is part of a face or not. However, the user or some automated algorithm could generate a control image or mask as the control channel and that identified facial areas. The mask would then be used to control color reproduction differentially for the faces. Similar techniques could also be used for other types of objects that may need special color treatment based on the object the color represents, such as blue sky or foliage.

Yet another possible use of the invention is to control gamut mapping. The ICC Profile format only allows for four discrete styles of gamut compression (called rendering intents). However, one may want to allow continuously variable gamut mapping. A typical output transform maps CIELAB to CMYK values. The invention could be used to add an input channel that would control the style of gamut compression. For example, a parameter could be used to vary preference between preserving hue to preserving saturation. The setting of this parameter could be made interactively by an operator, either at one setting for the entire image, or even differently for different objects in the scene.

Another use of the enhanced control channel transforms is as a diagnostic tool. In this case, the control channels could be fed by a reference image. The transform structure could be used to compute a measure of the color difference at each pixel. Because of the flexibility of the grid structure the measure could be quite sophisticated. For example, changes in flesh tones could generate a larger signal than a corresponding difference in less important colors. This type of sophisticated comparison may be useful in medical and remote sensing applications. Furthermore, because the transform would be packaged in an enhanced profile it would be easier to modify, distribute, and apply than a separate image processing software package that computes a similar function.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

PARTS LIST

10 System
12 Input Device
14 Computer
15 User Input
16 Output Device
18 Input Tables
20 Grid Tables
22 Output Tables
32–42 Process Steps
52–58 Process Steps
62–74 Process Steps
82–92 Process Steps

What is claimed is:

1. A method of creating an image transform, comprising:
generating an input lattice of points including color image range values and control range values;
evaluating the lattice using a model of a desired transform and producing output points; and
using the output points to form the image transform, which includes input channels for color image range values and continuous control range values.

2. A method as recited in claim 1, further comprising generating an image transform by evaluating the lattice at fixed control channel values.

3. A method as recited in claim 1, further comprising transforming an image where the image includes a plane of channel control values used in the transforming.

4. A method as recited in claim 1, further comprising transforming an image with said transforming comprising:
selecting image transforms responsive to a control channel value;
interpolating between the image transforms producing an interpolated transform; and
transforming the image using the interpolated transform.

5. A method of performing an image transformation, comprising:
inputting image values and a continuously variable dimension value for a channel control value; and
transforming the image using a transform comprising a multi-dimensional lattice of points including dimensions corresponding to the image values and to a channel control value.

6. A method as recited in claim 5, wherein the image includes a plane of channel control values used in the transforming.

7. A method as recited in claim 5, wherein said transforming comprises:
selecting an image transform responsive to the control channel value; and
transforming the image using the image transform.

8. A method as recited in claim 5, wherein said transforming comprises:
selecting image transforms responsive to a control channel value;
interpolating between the image transforms producing an interpolated transform; and
transforming the image using the interpolated transform.

9. A method of creating a transform, comprising:
creating an image transform from a model of characteristics of a device; and
combining a control channel transform with the image transform to produce a channel control image transform having at least one input dimension which is a continuously variable non-image-bearing parameter.

10. A method as recited in claim 9, wherein said combining further comprises:
selecting a control channel having control channel values;
creating a channel control transform for fixed control values; and
composing the channel control image transform and the control channel transform to produce a production transform.

11. A method as recited in claim 9, wherein said combining comprises:
selecting a control channel having control channel values;
creating a channel control transform for each of the values;
composing the image transform and each control channel transform producing channel control image transforms; and
creating a profile including the channel control image transforms.

12. A method as recited in claim 11, further comprising generating an image transform by evaluating the lattice at fixed control channel values.

13. A computer readable medium storing a transform suitable for controlling a computer performing a transformation of a color image and the transform comprising a grid table having entries addressable by inputs corresponding to calorimetric values and floating point channel control values.

14. A medium as recited in claim 13, further storing identification information identifying a type of channel control provided by the channel control values.

15. A system, comprising:
an input device inputting an image and channel control values; and
a computer transforming the image using a multi-dimensional lattice of points, including dimensions for image values and a dimension for one or more continuous channel control values, responsive to the image and the channel control values.

16. A system as recited in claim 15, wherein the image includes a control value plane having control values capable of being interactively changed by a user.

17. A system as recited in claim 15, wherein the control values comprise an image.

18. A system as recited in claim 15, wherein the control values are non-colorimetric values.

19. A system as recited in claim 15, wherein the control values are generated by applying a spatial filter to the input image values.

20. A system as recited in claim 15, wherein the control values are used to identify certain types of objects in the image for differential processing.

21. A system as recited in claim 15, wherein the control values are used to trade off noise amplification versus color accuracy in the transformed image.

22. A system as recited in claim 15, wherein the control values are taken from an alpha channel used for producing a composite image.

23. A system as recited in claim 15, wherein the control values are generated by comparing consecutive frames of a motion picture.

24. A system as recited in claim 15, wherein the control values are based on the apparent dimensions of the image when reproduced.

25. A system as recited in claim 15, wherein the control values are based on a quality of paper used to reproduce the image.

26. A system as recited in claim 15, wherein the control values are based on a lightness/darkness of the area surrounding a reproduced image.

27. A system as recited in claim 15, wherein the control values are based on a dot gain of a printing process.

28. A system as recited in claim 15, wherein the control values are based on a type of halftoning technique used to print the image.

29. A system as recited in claim 15, wherein the control values are based on a highlight/shadow points of the image.

30. A system as recited in claim 15, wherein the control values are based on a contrast and brightness settings of a CRT.

31. A system as recited in claim 15, wherein the control values are based on a settings of a camera used to record the image.

32. A color management process, comprising:
   inputting a color image and control values both varying over the range of an unsigned integer value of at least 8-bits; and
   performing a color transform using a grid table having dimensions for colorimetric values and control values.

33. A computer readable medium storing a transform suitable for controlling a computer performing a transformation of a color image and the transform comprising a multi-dimensional grid table where a number of input grid dimensions is equal to a total number of input image channels and input control channels where the control channels are non-image bearing and free to take on values on a substantially continuous domain.

34. A medium as recited in claim 33, wherein said transform incorporates one-dimensional input tables to adjust a spacing of the grid points.

35. A medium as recited in claim 33, wherein said transform includes information for constructing a graphical interface to accept user input.

36. A medium as recited in claim 33, wherein said transform includes default values for the input control channels.

37. A medium as recited in claim 33, wherein said transform computes a color appearance model and the control channels are parameters of said model.

38. A medium as recited in claim 33, wherein said transform converts colorimetry to colorant values and the control channels affect the usage of black colorant.

39. A medium as recited in claim 33, wherein said transform converts scanner values to colorimetry and the control channels are used to correct for exposure errors.

40. A method of creating an image transform, comprising:
   generating an m+n dimension input lattice of points including color image range values and control range values both chosen from a continuous domain, where m is an integer number of dimensions of the color image range values, n is an integer number of dimensions of the control range values, where n is at least one, and where the presence of control dimensions increases the number of lattice points by a factor of at least four;
   evaluating the lattice using a model of a desired transform and producing output points; and
   using the output points to form the image transform.

41. A method of creating an image transform, comprising:
   generating an input lattice of points including color image range values and control range values selected from a continuous domain where the control range values do not select a transform from a set of device calibration transforms;
   evaluating the lattice using a model of a desired transform and producing output points; and
   using the output points to form the image transform which includes input channels for color image range values and control range values.

42. A method of creating an image transform, comprising:
   generating an input lattice of points including both color image range values and control range values where the control range values are chosen from a continuous domain and vary the aesthetic properties of the color reproduction;
   evaluating the lattice using a model of a desired transform and producing output points; and
   using the output points to form the image transform which includes input channels for color image range values and for control range values where the control range values provide continuous control over aesthetic properties of the color reproduction and where the input control channels are not conventional red, green, and blue channels.

* * * * *

UNITED STATES PATENT AND TRADEMARK OFFICE
CERTIFICATE OF CORRECTION

PATENT NO. : 6,650,771 B1
DATED : November 18, 2003
INVENTOR(S) : Douglas G. Walker It is certified that error appears in the above-identified patent and that said Letters Patent is hereby corrected as shown below:

Title page,
Item [57], ABSTRACT,
Line 8, after "conventional" delete "calorimetric" and insert -- colorimetric --

Column 12,
Line 13, after "corresponding to" delete "calorimetric" and insert -- colorimetric --

Signed and Sealed this

Tenth Day of May, 2005

JON W. DUDAS
*Director of the United States Patent and Trademark Office*